F. H. HOPKINS.
DIFFERENTIAL PRESSURE GAGE.
APPLICATION FILED JAN. 30, 1907.
900,371.
Patented Oct. 6, 1908.
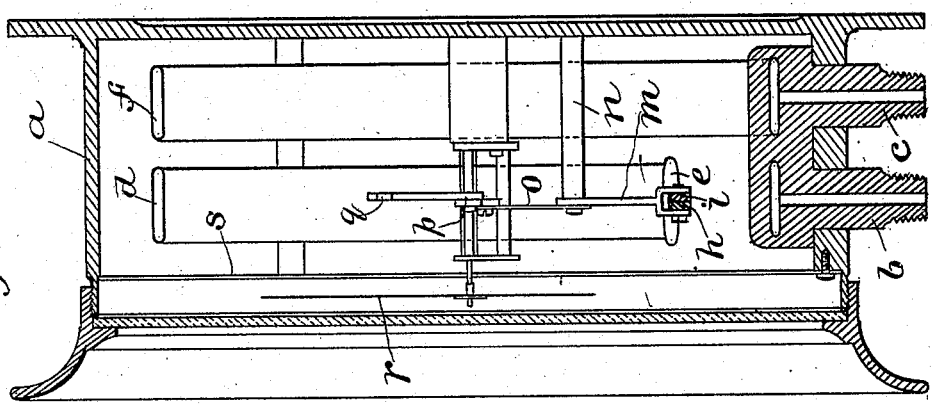
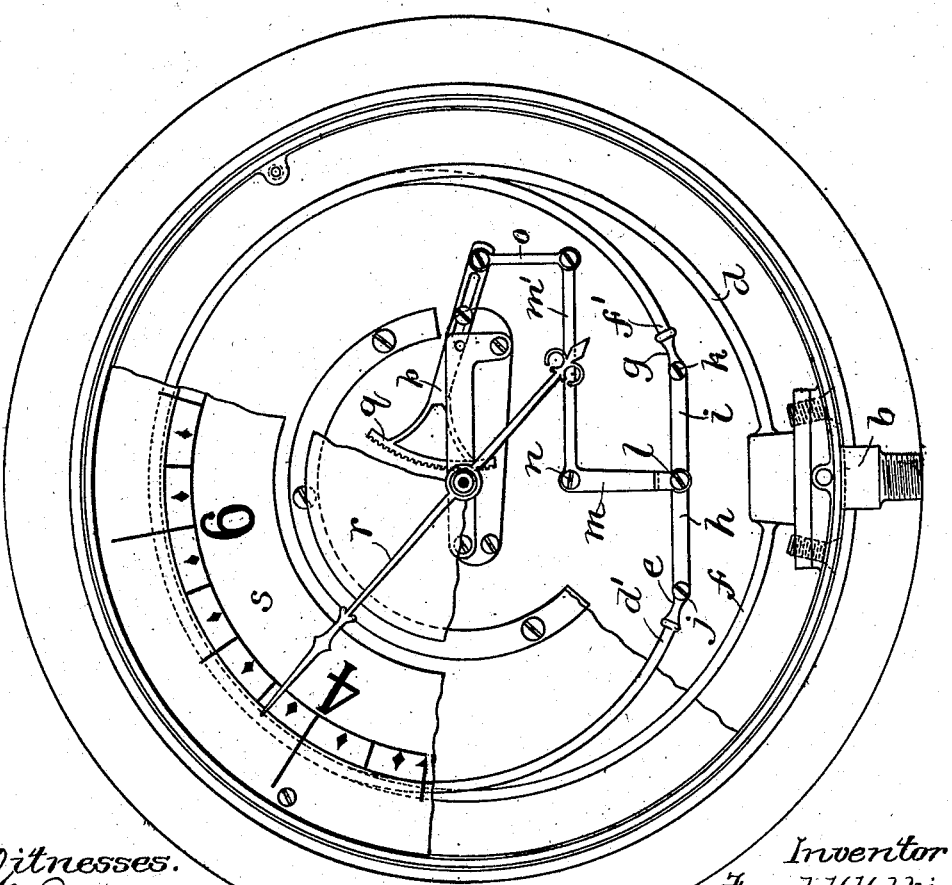
Witnesses.
A. C. Ratigan
H. L. Robbins
Inventor.
Frank H. Hopkins
by Wright Brown Quimby May
Atty's.

UNITED STATES PATENT OFFICE.

FRANK H. HOPKINS, OF SOMERVILLE, MASSACHUSETTS, ASSIGNOR TO AMERICAN STEAM GAUGE AND VALVE MANUFACTURING COMPANY, OF BOSTON, MASSACHUSETTS, A CORPORATION OF NEW JERSEY.

DIFFERENTIAL-PRESSURE GAGE.

No. 900,371.     Specification of Letters Patent.     Patented Oct. 6, 1908.

Application filed January 30, 1907. Serial No. 354,859.

*To all whom it may concern:*

Be it known that I, FRANK H. HOPKINS, of Somerville, in the county of Middlesex and State of Massachusetts, have invented certain new and useful Improvements in Differential-Pressure Gages, of which the following is a specification.

This invention relates to gages for indicating differences between two or more pressures, the object being to provide an improved, simple and efficient device, which, when connected with different sources of supply, will actuate an indicator so as to show the amount by which one pressure exceeds the other, rather than to show either pressure absolutely.

Of the accompanying drawings,—Figure 1 represents an elevation of a gage embodying the features of my invention. Fig. 2 represents a section of the gage.

The same reference characters indicate the same parts in both figures.

In carrying out my invention, I secure in the case $a$ of the gage a plurality of nipples $b$ and $c$ which are adapted to be connected with tubes for conducting fluid, and from which extend curved spring tubes of the ordinary Bourdon type. The passages in the nipples open directly into the interior of the tubes. From the nipple $b$ the tube $d$ extends to the right, as seen in Fig. 1, and forms almost one complete convolution of a spiral terminating at $d'$ where the end is closed, and is furnished with a coupling $e$. Similarly from the nipple $c$ extends to the left a corresponding tube $f$ terminating at $f'$ where it is closed, and having a coupling $g$. It will be understood that if pressure is applied in either nipple, there will be a tendency to straighten the tubes, which will tend to move their closed ends away from each other.

Links $h$ and $i$ are pivoted to studs $j$ and $k$ on the coupling members $e$ and $g$ respectively, said links being joined by a pivot $l$ to which is connected a bell-crank lever $m$ mounted upon a stud $n$. The arm $m'$ of the bell-crank extends to the right and is connected by means of a link $o$ with a lever $p$ having a gear segment $q$ meshing with a pinion on the spindle of a hand or indicator $r$. The hand, gear segment, and lever $p$ are practically the same as those ordinarily employed in pressure gages operated by a single pressure.

As before stated, when fluid under pressure is admitted to the nipples, the ends of the tubes are pulled in opposite directions, thereby pulling oppositely upon the links $h$ and $i$, tending to move them and the bell-crank $m$ in both directions at once. The motion of one tube is resisted by the pressure acting upon the other, and consequently the resultant motion of the bell-crank and indicator $r$ will be that due to the stronger pressure, and will be proportional in amount to the excess of such pressure. If the two pressures are equal, there will of course be no movement of the parts, and the hand will register zero on the dial $s$. If, however, the tube $f$ contains a pressure which is, say, four pounds greater than that in the tube $d$, the hand will be positioned near the figure 4 on the dial, showing simply the amount by which the greater pressure exceeds the less without any regard to what the absolute values of the pressures are.

One of the principal uses to which such a gage is put is in connection with a Venturi water meter in which water is caused to pass through a tapered contraction in a pipe. The pipe is tapped at the beginning of the taper, and at the point of greatest contraction, and the pipes lead from these separate points to the nipples $b$ and $c$ respectively. By observing the differences between the pressures at these points, the velocity of flow of the water can be calculated, and a gage such as that described eliminates unnecessary labor and chances of inaccuracy in observing the pressure differences.

I claim:—

1. A differential gage comprising a single indicator, a plurality of pressure actuated flexible tubes each connected with a separate source of pressure, means so connecting said members as to cause the pressure in each member to directly and positively oppose any movement of the other member, and operating means for the indicator controlled by said connecting means, whereby the indicator is actuated proportionally to the movement caused by the stronger pressure.

2. A differential gage comprising a single indicator, a plurality of flexible tubes each connected with a separate source of pressure, means so connecting said devices as to cause the pressure in each device to directly and positively oppose any movement of the other member, and operating means for the indicator attached to and controlled by said connecting means, whereby the indicator is actuated proportionally to the movement caused by the stronger pressure.

3. A differential gage comprising a single indicator, a plurality of curved tubular members supported at one end and each connected with a separate source of pressure, means so connecting the free ends of said members as to cause the pressure in each member to directly and positively oppose any movement of the other member, and operating means for the indicator controlled by said connecting means, whereby the indicator is actuated proportionally to the movement caused by the stronger pressure.

4. A differential gage comprising a single indicator, a plurality of curved spring tubes each having closed ends and each connected with a separate source of pressure, links uniting the closed ends of said tubes and so arranged as to cause the pressure in each tube to oppose the movement in the other tube, and a lever operatively connected with said links for actuating said indicator proportionally to the movement caused by the stronger pressure.

5. A differential gage comprising a single indicator, a plurality of curved spring tubes each having a closed end and each connected with a separate source of pressure, a link connected at one end to each of the closed ends of said tubes, the opposite ends of said links being united, and a lever connected with said links at their point of union and connected with means for actuating the indicator.

6. A differential gage comprising a single indicator, a plurality of curved spring tubes each having a closed end and each connected with a separate source of pressure, said closed ends being arranged to move in opposite directions when under pressure, a link connected at one end to each of the closed ends of said tubes, the opposite ends of said links being united, and means operatively connected with said links for actuating said indicator.

7. A differential gage comprising a single indicator, a plurality of flexible members rigidly supported at one end and flexibly connected at the other end, and a lever for actuating the indicator, said lever being connected to the flexible members, the point of connection being permanently maintained with relation to the fulcrum of said lever.

In testimony whereof I have affixed my signature, in presence of two witnesses.

FRANK H. HOPKINS.

Witnesses:
A. C. RATIGAN,
A. H. BROWN.